United States Patent
Arhab et al.

(10) Patent No.: US 6,948,602 B2
(45) Date of Patent: Sep. 27, 2005

(54) HYDROKINETIC COUPLING APPARATUS, IN PARTICULAR FOR MOTOR VEHICLE

(75) Inventors: Rabah Arhab, St Brice Sous Foret (FR); Gustave Chasseguet, Taverny (JP); Alexandre Depraete, Amiens (FR); David Forgeron, Servins (FR); Daniel Satonnet, Amiens (FR); Norbert Termenon, Amiens (FR); Pascal Thery, Amiens (FR); Roël Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 8 days.

(21) Appl. No.: 10/344,679

(22) PCT Filed: Sep. 5, 2001

(86) PCT No.: PCT/FR01/02745
§ 371 (c)(1),
(2), (4) Date: Sep. 22, 2003

(87) PCT Pub. No.: WO02/21021
PCT Pub. Date: Mar. 14, 2002

(65) Prior Publication Data
US 2005/0029067 A1 Feb. 10, 2005

(30) Foreign Application Priority Data
Sep. 5, 2000 (FR) .......................................... 00 11318

(51) Int. Cl.$^7$ .............................................. F16H 45/02
(52) U.S. Cl. .................................. 192/3.29; 192/70.18
(58) Field of Search .............................. 192/3.28, 3.29, 192/3.31, 70.27, 214, 70.17, 70.18

(56) References Cited

U.S. PATENT DOCUMENTS

| | | | | |
|---|---|---|---|---|
| 4,413,711 A | * | 11/1983 | Lamarche | 192/3.28 |
| 4,437,551 A | | 3/1984 | Gimmler et al. | |
| 4,982,821 A | | 1/1991 | Tanaka | |
| 5,070,974 A | * | 12/1991 | Kirkwood | 192/3.3 |
| 5,377,796 A | * | 1/1995 | Friedmann et al. | 192/3.29 |
| 5,482,151 A | | 1/1996 | Ookubo et al. | |

FOREIGN PATENT DOCUMENTS

WO WO 99/45294 9/1999

* cited by examiner

Primary Examiner—Saul Rodriguez
(74) Attorney, Agent, or Firm—Liniak, Berenato & White

(57) ABSTRACT

A hydrokinetic coupling apparatus for a motor vehicle including a crankcase (12), designed to link in rotation, about an axis X, an input shaft to an impeller wheel; a turbine wheel (18) designed to be linked in rotation to an output shaft (16) via hub (14) and a flange (24) transversely oriented extending radially outwards relative to the hub; a lockup clutch (28) coupling the input and output (16) shafts comprising a piston (30) for releasably connecting the turbine wheel (18) to a substantially transverse wall (20) of the crankcase (12) against which the piston (30) is urged to lock the coupling; and at least a friction stop (68) interposed axially between the turbine wheel (18) and the piston (30). A friction stop (68) is arranged radially beyond the outer periphery (100) of the flange (24).

11 Claims, 3 Drawing Sheets

HYDROKINETIC COUPLING APPARATUS, IN PARTICULAR FOR MOTOR VEHICLE

BACKGROUND OF THE INVENTION

1. Field of the Invention

The present invention concerns a hydrokinetic coupling appliance for a motor vehicle.

2. Description of Related Art

There is already known, in the prior art, for example according to the document WO 99/45294, a hydrokinetic coupling apparatus, in particular for a motor vehicle, of the type comprising:

a casing, intended to rotationally connect, about an axis X, a driving shaft and an impeller wheel, a turbine wheel intended to be rotationally connected to a driven shaft, a clutch for locking the coupling of the driving and driven shafts comprising a piston for disengageably connecting the turbine wheel to a substantially radial wall of the casing against which the piston is forced for the locking of the coupling, and a friction stop interposed axially between the turbine wheel and the piston.

In general terms, in such a hydrokinetic coupling appliance, the casing provided with a substantially radial wall constitutes the input element and the output element for its part consists of a turbine wheel/hub assembly housed inside the casing. The piston is located between the assembly and the wall and is mounted so as to be able to move axially with respect to the wall, whilst being rotationally connected thereto.

In a conventional manner, the turbine wheel is driven by the impeller wheel by virtue of the circulation of a fluid, such as oil, contained in the casing.

In the case of a hydrokinetic coupling appliance for a motor vehicle, the driving shaft is the output shaft of the vehicle engine and the driven shaft is connected to gear ratio change means. After the vehicle is started, the locking clutch, also referred to as a "lock-up" clutch, controls the slip between the turbine and impeller wheels by controlling the driving of the driving shaft connected to the casing by the driven shaft connected to the turbine wheel. This drive control of the shafts is effected by clamping an annular friction disc arranged between the piston and the locking wall of the casing.

The connecting wall of the hub illustrated in this document comprises a substantially radial plate, made from the same material as the hub, and a damper plate connecting this hub to means of coupling the hub and friction disc with circumferential damping. The turbine is also connected to the plate of the hub. A bracing member, in the form of a flat ring, is interposed axially between the plate of the hub and the piston and forms a friction stop in order to prevent direct contact between this plate and this piston.

SUMMARY OF THE INVENTION

The aim of the invention is in particular to simplify the manufacture of a lock-up clutch and to minimise its cost whilst reducing in particular the number of parts making up this clutch.

To this end the object of the invention is a hydrokinetic coupling apparatus of the type mentioned above, characterised in that the friction stop is disposed radially beyond the external periphery of the plate.

By virtue of the invention, the implementation of the friction stop function of the piston is simplified thereby and makes it possible to prevent any direct contact between the piston and, according to the embodiment, any one of the components of the turbine wheel/hub assembly or an element such as the damper plate of a damping device.

In addition, the friction stop being disposed radially beyond the external periphery of the plate, the area for transmission of forces from the turbine onto the piston is thus brought closer to the abutment area of the piston. In this way the deformation of the piston and the relative movement between the turbine and the casing are reduced so that the piston suffers less stress.

According to the characteristic of various embodiments of this apparatus:

the friction stop is carried by one of the elements of the turbine wheel/hub assembly;

the friction stop is carried by the piston;

the friction stop comprises an active friction part and a passive part comprising means of connection with the element which carries the stop by cooperation of complementary shapes;

the friction stop is in a single piece;

the friction stop is in at least two pieces comprising respectively the active part and the passive part;

the piston comprises at least one element formed in projection which cooperates with complementary assembly means of the friction stop;

the piston comprises at least one hole which receives complementary assembly means of the friction stop;

the hole is blind;

the hole is a through hole and forms a passage orifice for a fixing tool for the means of rotationally connecting the piston and casing;

sealing means intervene between the piston hole and the passive part of the friction stop, and at least one lubrication groove (R) is formed in the active friction part and/or in the piece against which the said stop bears.

The teachings of the present invention can be implemented in any type of hydrokinetic coupling appliance, in particular appliances equipped with a clutch of the dual face type, that is to say comprising two friction surfaces, or in clutches of the multidisc type.

BRIEF DESCRIPTION OF THE DRAWINGS

The invention will be better understood from a reading of the following description, given solely by way of example and made with reference to the drawings, in which.

DETAILED DESCRIPTION OF PREFERRED EMBODIMENTS

In the figures the common elements will, for simplicity, be allocated the same reference signs.

Figure 1:
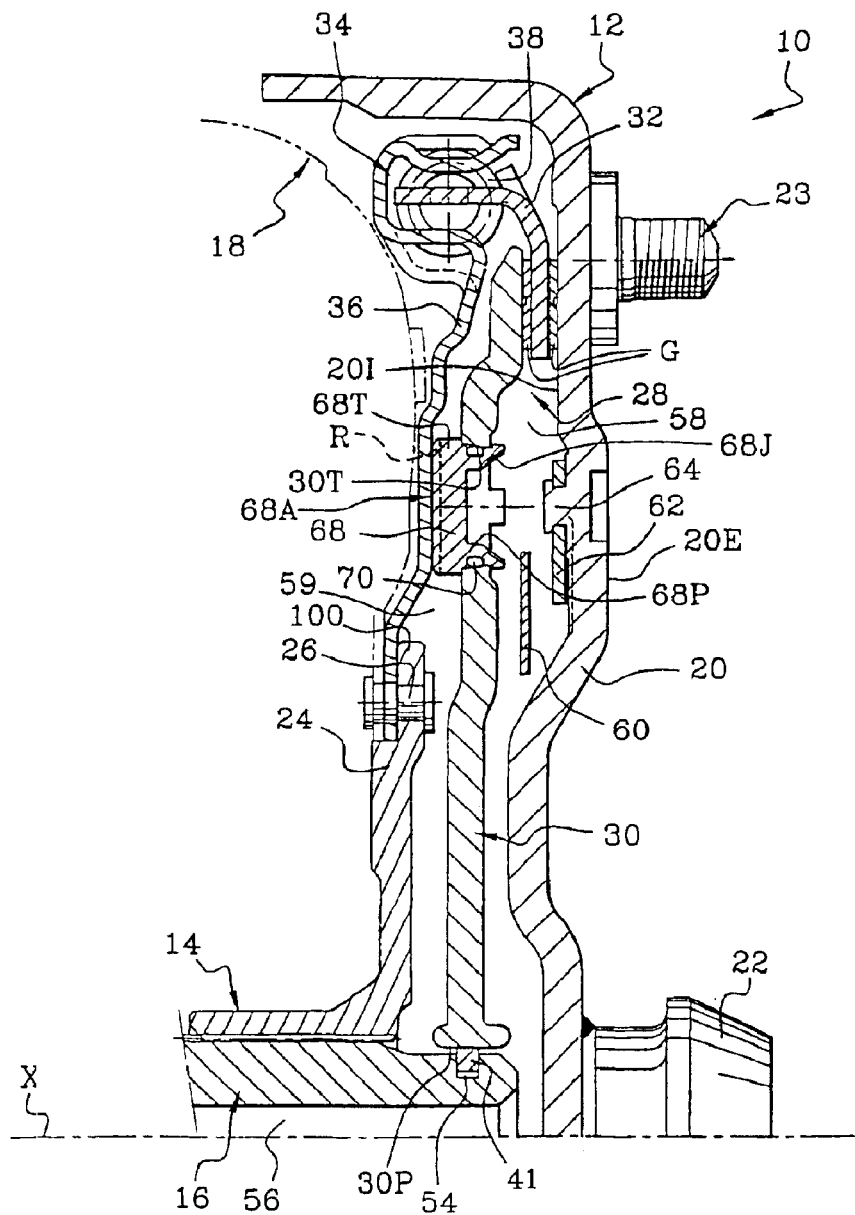
FIG. 1 is a half view in axial section of a hydrokinetic coupling appliance according to a first embodiment of the invention.

FIG. 1 depicts a hydrokinetic coupling appliance according to a first embodiment of the invention, designated by the general reference 10. This appliance 10 is intended to couple two driving and driven shafts, for example in a motor vehicle automatic transmission. In this case, the driving shaft is the output shaft of the vehicle engine and the driven shaft is connected to a gear ratio change means.

In a conventional fashion, the hydrokinetic coupling appliance 10 comprises a casing 12, intended to rotationally connect the driving shaft and an impeller wheel. The driving shaft and the impeller wheel, known per se, are not shown in the figures.

The appliance 10 also comprises a hub 14 intended to rotationally connect the driven shaft 16 and a turbine wheel 18, only part of the profile of which is shown in dot and dash lines in FIG. 1.

Hereinafter the axial and radial orientations are considered with respect to the axis X of the appliance. The casing 12 comprises a substantially radial wall 20 provided with a surface 20E, external to the casing, carrying conventional means of coupling with the driving shaft. These coupling means comprise in particular a centring member 22 and screwing means 23.

The hub 14 comprises here a substantially radial plate 24 provided with conventional means 26 of connection with the turbine wheel 18. The hub 14 is coupled to the driven shaft 16 by the cooperation of axial grooves and flutes provided on the latter.

The hydrokinetic coupling appliance 10 also comprises a clutch 28 for locking the coupling of the driving and driven shafts. This clutch 28 is activated after starting of the vehicle and hydraulic coupling of the driving and driven shafts.

In a conventional manner, the clutch 28 comprises a moving locking piston 30 intended to be forced against the casing 12 for locking the coupling of the shafts or controlling the slip between the turbine and impeller wheels.

The clutch is here of the dual face type, in which a friction disc 32 is intended to be clamped between the piston 30 and a surface 20I of the wall 20, internal to the casing 12. The friction disc 32, interposed axially between the piston 30 and the wall 20, referred to as the locking wall, comprises friction linings G arranged here and in a manner known per se on its two opposite faces.

Naturally other variant embodiments can be envisaged, and thus the friction could be produced directly between the pieces 30, 32, 20 preferably having been treated with a view to such an application.

The friction linings G can be arranged directly or indirectly on the friction disc 32 or on the piston 30 and/or the surface 20I. In a variant, at least one of the linings can belong to an additional piece attached by any means, for example by welding. The various embodiments above can of course be combined.

In a variant, the external periphery of the disc 32 is embedded in a friction lining. Preferably the linings G are provided with grooves which also, in addition to allowing better cooling, make it possible to work in controlled slip.

By varying the pressure on each side of the piston 30, the latter is moved axially in one direction or the other, so that the said piston is able to move axially with respect to the hub 14.

The friction disc 32 is here connected to the hub 14 by means of a damping device also comprising means 34, 38. The means 34 comprise a damper plate 36 connected to the plate 24 of the hub by means for example of connection means 26, such as rivets or a weld, common to the turbine wheel 18 and to the damper plate 36. Circumferentially acting elastic members 38 are interposed, in a manner known per se, between the friction disc 32 and the damper plate 36, in order to provide the required damping effect.

It should be noted that the plate 24 and the damper plate 36 form a substantially radial connecting wall fixed to the hub 14.

The hydrokinetic coupling appliance 10 also comprises at least one sealing means 41, such as a segment or a joint, intervening between one end of the shaft 16 and the piston 30 and intended to separate two chambers 58, 59 which will be described subsequently. Naturally the sealing means 41 can be carried by the shaft 16 or by the piston 30.

It should be noted that the end of the driven shaft 16 is provided with an end bevel in order to facilitate here the mounting of the sealing segment 41 by fitting in.

The piston 30 comprises a radially internal substantially axial annular part which internally delimits a cylindrical bearing surface 30P cooperating by sliding with the sealing segment 41 of the driven shaft 16. The sealing segment 41, interposed between the end of the driven shaft 16 and the bearing surface 30P of the piston is housed for example in an annular groove 54 produced in the driven shaft 16.

It should be noted that the driven shaft 16 is provided with an axial bore 56 opening out at the free end of the shaft 16. The bore 56 communicates with a chamber 58, referred to as the control chamber for the lock-up clutch 28, which is delimited in particular by the radial wall 20 of the casing, the piston 30 and the friction disc 32. The chamber 58 is supplied with pressurised oil by a conventional hydraulic circuit to which the bore 56 of the driven shaft 16 is connected.

The control chamber 58 is isolated from a chamber 59 in which the turbine wheel 18 lies, referred to as the turbine chamber, in particular by the piston 30 and the sealing means 41.

The piston 30 is rotationally connected to the locking wall 20 of the casing by conventional means described for example in the document WO 99/45294.

These connection means comprise here tangentially oriented flexible tongues 60 distributed circumferentially. These tongues 60, interposed between the piston 30 and the locking wall 20 of the casing, allow—by elastic deformation—an axial movement, that is to say the translational guidance of the piston 30.

The number of tongues 60 depends on the application, these preferably being distributed regularly circumferentially in several sets of tongues, each set comprising at least one tongue. The tongues 60 can be transversely oriented, being for example triangular or rectangular in shape, or tangentially oriented.

Figure 2:
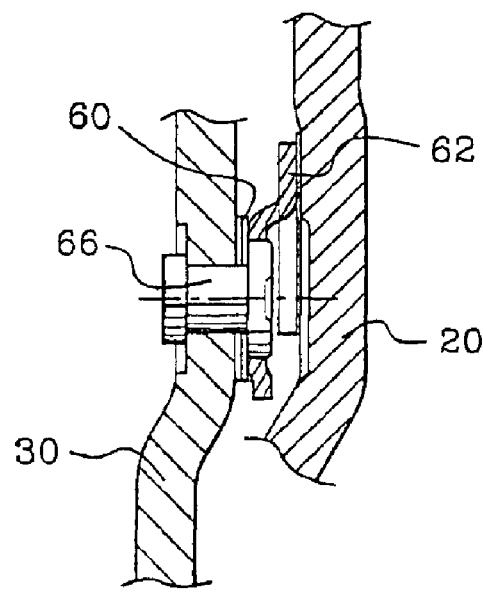
FIG. 2 is a partial view of an axial section similar to that of FIG. 1 along a cutting plane offset axially with respect to that in FIG. 1.

A first end of the tongues 60 is connected to the locking wall 20 here by means of a ring 62 fixed to this wall 20 by rivets 64 made in one piece with the casing 12 (see FIGS. 1 and 2).

The second end of the tongues 60 is connected to the piston 30 by rivets 66 (see FIG. 2).

The tongues 60 guide the piston 30 axially between the plate 24 and the locking wall 20.

The mounting of the piston 30 in the casing 12 is known per se. First of all, the tongues 60 are attached to the ring 62 and the piston 30 and then this ring 62 is fixed to the locking wall 20. In order to perform the latter fixing operation, through holes 30T provided in the piston 30 substantially in line with the rivets 64 and form passage orifices for the access to the rivets 64 of a fixing and mounting tool and. In order to provide fluidtightness of the control chamber 58, the orifices 30T, distributed circumferentially over the piston 30, are each closed off by means such as plugs 68 after the mounting of the piston 30 in the casing 12.

In operation, when the hydraulic coupling is established between the impeller and the turbine 18, the driving shaft, connected to the impeller wheel by the casing 12, is connected to the driven shaft 16, connected to the turbine 18 by the hub 14, by movement of the piston 30 against the internal surface 20I of the locking wall so as to clamp the friction disc 32 between this wall 20 and this piston 30. The locking (also referred to as clamping) of the clutch 28 and the unlocking (also referred to as unclamping) of this clutch 28 are performed in a manner known per se by varying the pressure between the control chamber 58 and the turbine chamber 59.

In the first embodiment depicted in FIG. 1, a friction stop 68 is interposed axially between the turbine wheel 18 and the piston 30, so that any direct contact between the piston 30 and a facing element, here the damper plate 36, is prevented.

According to the invention, the friction stop 68 is disposed radially beyond the external periphery 100 of the plate 24.

The plate should not be interpreted limitingly to the embodiments depicted in which the said plate 24 is made in one piece with the hub 14, thus in a variant the plate 24, which designates here a substantially radial wall, consists of the turbine wheel or an element rotationally connected thereto or to the hub, the damper plate of the damper could for example constitute this element.

In this way the area for transmission of forces from the turbine to the piston is brought closer to the abutment area of the piston, that is to say the area in which the friction linings G are disposed and, in this way, the deformation of the piston 30 and the relative movement between the turbine 18 and the casing 12 are reduced, so that the piston is subjected to lower stresses than in the case where the friction stop is disposed for example radially at the internal periphery of the plate 24.

The friction stop 68 comprises an active friction part 68A and a passive part 68P comprising means 68J of connection with the element which carries the stop, here the piston 30. The stop is here in a single piece.

The connection of the stop 68 and the piston 30 is here achieved by cooperation of complementary shapes but it could of course be achieved by any other means, for example by welding or adhesive bonding.

In this first embodiment according to the invention, at least some of the plugs forming means of closing off the orifices 30T also advantageously constitute friction stops 68 interposed between the turbine wheel/hub assembly and the piston 30.

Assembly within the meaning of the present invention should be taken to mean one of the turbine wheel or hub elements or any element rotationally connected to the latter.

In the example illustrated in FIG. 1, the friction stop 68, that is to say here one of the plugs, is preferably manufactured from a material chosen from amongst thermoplastic or thermosetting synthetic materials, mixtures of synthetic materials, these materials being reinforced or not by fibres such as glass fibres, aramids (in particular sold under the name Kevlar) or carbon fibres or glass balls.

It is therefore possible, according to the application, to choose the coefficient of friction of the stop 68 of the piston appropriately according to the material used. The plug 68 forming stops preferably each comprise a support head 68T constituting the active part 68A of the friction stop, here against the damper plate 36. The head 68T is extended by a skirt 68J which is fitted in the passage orifice 30T and which constitutes the passive part 68P of the stop. The skirt 68J constitutes the means of connecting the stop 68 to the piston 30 by cooperation of shapes.

Naturally the skirt 68J can be discontinuous, the assembly means can then be produced in the form of axial lugs, preferably at least two diametrically opposed with respect to the through hole 30T.

The connection by cooperation of shapes of the skirt 68J, or of the lugs, can for example consist of a snapping in or elastic fitting in.

Preferably at least one lubrication groove R is provided in the active part 68A of the friction stop 68, here in its support head 68T in contact with the damper plate 36, in order to facilitate the sliding between the pieces by establishing a passage of the fluid or at least the formation of a film. Naturally the groove or grooves could be produced conversely on the piece against which the friction stop 68 comes into abutment, that is to say here the damper plate 36, but also in other possible embodiments one of the turbine wheel/hub assembly elements 18, 36, 24.

In a variant the grooves R are produced on the two pieces, that is to say on the plug 68 and on the piece against which it bears 18, 36, 24.

Such grooves make it possible to renew the oil (fluid) film between the support head 68T of the plug 68 and the damper plate 36 so that wear resulting from the friction is reduced and the risk of sticking between the parts avoided.

Moreover, sealing means 70, such as a joint, intervene between the passive part 68P comprising the means of assembling the plug forming a stop and the contour of the passage orifice 30T.

The design of the grooves is favourable to an increase in the service life of the friction stop 68, and the reliability of the whole.

The locking, also referred to as clamping, of the clutch 28, which consists of moving the piston 30 against the wall 20 whilst clamping the friction disc 32, and the unlocking (also referred to as unclamping) of this clutch 28 are achieved in a fashion known per se by varying the pressure between the control chamber 58 and the turbine chamber 59.

A second embodiment of the hydrokinetic coupling appliance according to the invention will now be described with reference to FIG. 3. In this figure, the elements similar to those depicted in FIGS. 1 and 2 are designated by identical references.

In this embodiment, the friction stop 68 is carried by the piston 30, is arranged radially beyond the external periphery 100 of the plate 24, and is produced in a single piece.

In this case, the friction stop 68 also consists of the obturation means, here metallic plugs preferably produced from pressed sheet metal, and which are for example forcefitted in the corresponding passage orifices 30T. Each plug 68 has the general form of a bowl and comprises a re-entrant rolled edge 68R here constituting the active part 68A of the friction stop 68, the edge 68R being in abutment against the damper plate 36.

Naturally the metallic plugs, in particular the active part 68A, can be given treatment with a view to improving the properties, for example their coefficients of friction.

The passive part 68P comprising the means of assembly with the piston 30 by cooperation of complementary shapes consists here of the edges of the plug 68 which cooperate with those of the orifice 30T.

In this embodiment, when the metallic plug 68 is force-fitted in the orifice 30T in the piston 30, the seal is provided without its being necessary to add additional means such as a joint 70.

Naturally other shapes and plugs can be envisaged, in which it would be possible to produce at least one lubrication groove R in the active part 68A and/or in the piece against which it bears.

Figure 4:
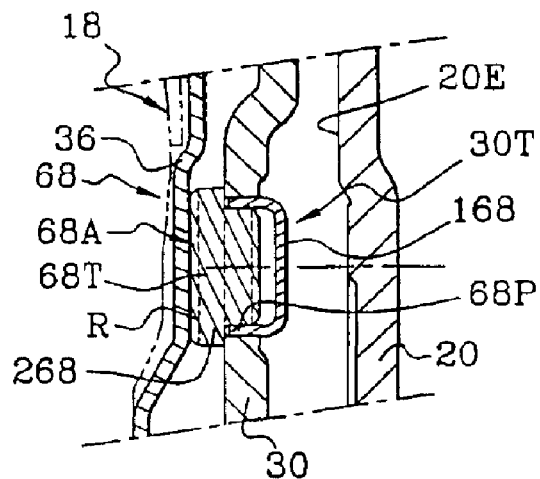
FIG. 4 is a partial view in section of a detail of the third embodiment.
Figure 5:
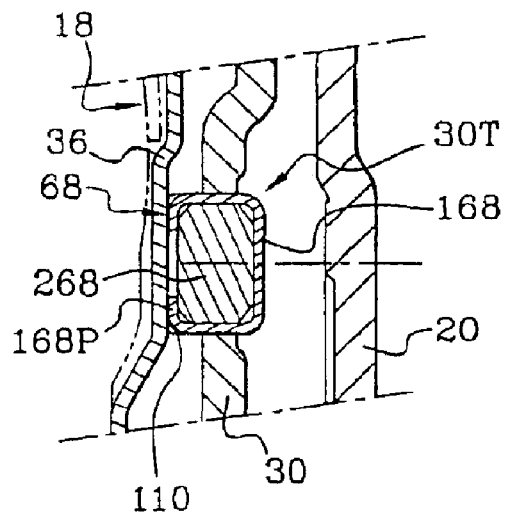
FIG. 5 is a partial view in section of a detail of the fourth embodiment.
Figure 6:
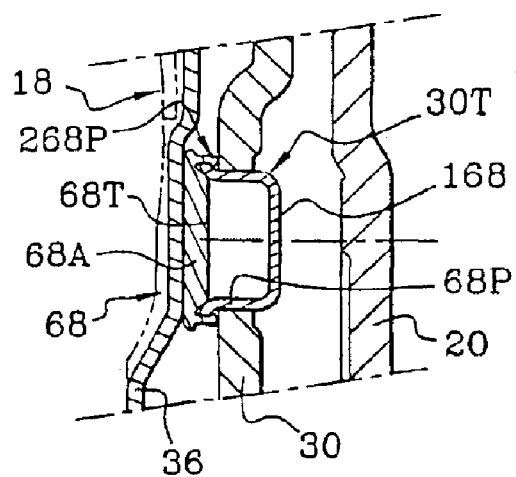
FIG. 6 is a partial view in section of a detail of the fifth embodiment.

In the embodiments depicted in FIGS. 4 to 6, the friction stop 68 is carried by the piston 30, radially beyond the external periphery 100 of the plate 24 and is produced in two pieces comprising respectively an active part 68A and a passive part 68P.

The friction stops 68 also constitute obturation means or plugs for the passage orifices 30T produced in the piston 30, the passive part 68P of which comprises means of assembly with the said piston by cooperation of complementary shapes.

In these embodiments the passive part 68P consists of a first metallic piece 168, for example made from sheet metal, having substantially a bowl shape, this piece being force-fitted in the holes or passage orifices 30T. No sealing means is then necessary between the hole 30T in the piston and the passive part 68P.

In these embodiments the active part 68A of the friction stop consists of a second piece 268, preferably made from synthetic material, which is attached to the first piece 168. Advantageously the piece 268 forming the active part 68A has a support head 68T.

At least one lubrication groove (R) can be provided in the active part 68A of the stop 68, here more particularly in the head 68T, and/or in the piece against which the said stop bears.

In a third embodiment illustrated in FIG. 4, the second piece 268 forming the active part 68A of the stop consists of a plug force-fitted in the first piece 168.

In a variant, the second piece 268 has an axial clearance with respect to the first piece 168 without however being able to completely emerge from the bowl 168.

Figure 3:
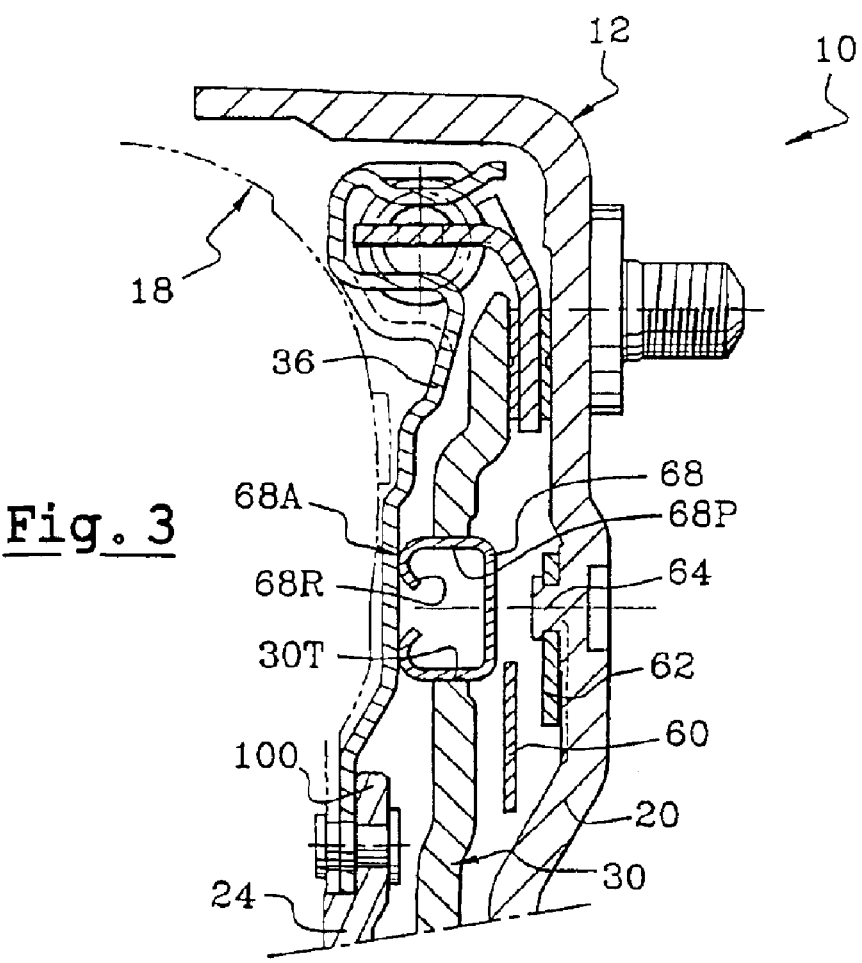
FIG. 3 is a partial view of a section similar to FIG. 1 showing a hydrokinetic coupling apparatus according to a second embodiment of the invention.

In a fourth embodiment illustrated in FIG. 3, the first piece 168 in the form of a bowl has, on the side of where it is open, at least two lugs 168P whilst the second piece 268 consists of a plug fitted in the said opening and which comprises a head 68T in which a groove 110 is formed. The connection between the first and second pieces forming the friction stop 68 is made by crimping, the lugs 100 being folded over into the groove 110.

In a fifth embodiment illustrated in FIG. 6, the second piece 268 forming the active part 68A comprises at its external periphery a skirt or lugs 268P for its clipping or elastic fitting on the first piece 168.

The invention is not limited to the embodiments described above. In particular, the plug 68 forming a friction stop can cooperate with any wall fixed to the turbine wheel 18, namely in particular a connecting wall fixed to the hub 14, as described above, or a wall delimiting the turbine wheel 18 itself.

Many variants can be envisaged. Thus, in a variant, only some of the plugs forming the obturation means 68 thus constitute friction stop means 68 for the piston 30. In the case of a design with a plurality of plugs evenly distributed over the piston 30, only one plug out of two combines for example the two functions of closure and friction stop.

The obturation means 68 and friction stop means can consist of one and the same part such as a plug, according to the embodiments detailed above, but they can also, without departing from the scope of the present invention, be distinct.

In a variant, a piece forming the friction stop is attached to one or more of the obturation means 68. By way of example, such a plug, preferably metallic, carries a piece fulfilling the function of friction stop, which is for example produced from synthetic material or any other material. In the case of a friction stop made from synthetic material, many variant embodiments for attaching this element to a plug of the metallic type can be envisaged. The plug then comprises a part such as a head to which the friction stop would be attached.

Amongst the possibilities for attaching the friction stop, it is possible to cite non-limitingly clipping, moulding on, snapping on, fitting in, buttoning, screwing, riveting or bayonet mounting.

For each mode, it is possible to adapt the plug 68, thus, for example in order to mould the stop onto the plug, it is possible to provide on the latter a flat head extended by a rim for better mechanical strength, that is to say substantially the shape of a rivet head.

Likewise it is possible to produce, for example by moulding from synthetic material, stops comprising lugs in order to attach them to the obturation means by clipping or snapping on, and thus to form an assembly consisting of friction stop and obturation plug 68. The holding can also be provided by an additional piece such as clips.

For a mounting of the bayonet type, it is possible to produce a thicker part on the obturation means which, in a first step, enters a complementary part of the element forming a front stop, and secondly effecting a rotation in order to implement the said bayonet mounting.

Whatever the embodiment adopted, if the friction stop is of the synthetic material type, it is possible to produce as many stops as there are plugs which form shoes, these shoes having different geometries according to the required application, for example circular, rectangular or oblong.

It can be envisaged producing sectors forming friction stops 68 between two successive plugs, fixed to at least one head of one of the plugs. Likewise, in a variant, the friction stop 68 consists of one and the same piece having substantially the shape of a ring or annulus.

It should be noted that, in some of the embodiments, several functions are advantageously combined by the same component, in particular here the combining of the functions of seal and friction stop by at least one plug 68. It is thus possible to reduce the number of elements constituting the lock-up clutch and to reduce the manufacturing cost of the hydrokinetic coupling appliance.

Thus it is no longer necessary to modify or adapt elements such as the hub 14, in particular the plate 24, or the piston 30 in order to arrange the friction stop means. This is particularly advantageous for parts such as the hub 14 or a guidance ring in so far as these parts are treated parts, in particular the hub in order to be able to slide along the driven shaft.

In a variant, the hole receiving the complementary assembly means of the friction stop 68 is a blind hole.

The invention is in no way limited to the embodiments described above in which the friction stop 68 is carried by the piston. This is because, in a variant, the friction stop is carried by the turbine wheel or a damper plate such as the damper plate of the damping device.

What is claimed is:

1. Hydrokinetic coupling appliance, in particular for motor vehicles, comprising:
   a casing (12), intended to rotationally connect, about an axis X, a driving shaft and an impeller wheel,
   a turbine wheel (18) intended to be rotationally connected to a driven shaft (16) by means of a hub (14) and a transversely oriented plate (24) which extends radially outwards with respect to the hub,
   a clutch (28) for locking a coupling of the driving and driven shafts (16) comprising a piston (30) for disengageably connecting the turbine wheel (18) to a substantially transverse wall (20) of the casing (12) against which the piston (30) is forced for the locking of the coupling, and
   at least one friction stop (68) interposed axially between the turbine wheel (18) and the piston (30) to prevent contact between the piston (30) and an element facing the piston (30), said at least one friction stop being disposed radially beyond the external periphery (100) of the plate (24), wherein the friction stop (68) is carried by the piston, and
   wherein the friction stop (68) comprises an active friction part (68A) and a passive part (68P) comprising means (68J) of connection with the element which carries the stop by cooperation of complementary shapes.

2. Hydrokinetic coupling appliance according to claim 1, characterised in that the friction stop (68) is in a single piece.

3. Hydrokinetic coupling appliance according to claim 1, characterised in that the friction stop (68) is in at least two pieces comprising respectively the active part (68A) and the passive part (68P).

4. Hydrokinetic coupling appliance according to claim 1, characterised in that the piston (30) comprises at least one element formed in projection which cooperates with complementary assembly means of the friction stop (68).

5. Hydrokinetic coupling appliance according to claim 1, characterised in that the piston (30) comprises at least one hole (30T) which receives complementary assembly means of the friction stop (68).

6. Hydrokinetic coupling appliance according to claim 5, characterised in that the hole is blind.

7. Hydrokinetic coupling appliance according to claim 5, characterised in that the hole is a through hole and forms a passage orifice (30T) for a fixing tool for the means of rotationally connecting the piston (30) and casing (12).

8. Hydrokinetic coupling appliance according to claims 5, characterised in that sealing means (70) intervene between the piston hole (30T) and the passive part (68P) of the friction stop (68).

9. Hydrokinetic coupling appliance according to claim 1, characterised in that at least one lubrication groove (R) is formed in the active friction part (68A) and/or in the piece (18, 36, 24) against which said friction stop bears.

10. Hydrokinetic coupling appliance according to claim 1, wherein the at least one friction stop (68) abuts at least one of a damper plate (36) facing the piston (30) and the turbine wheel (18).

11. Hydrokinetic coupling appliance according to claim 1, wherein the least one friction stop (68) abuts a damper plate (36) facing the piston (30).

* * * * *